United States Patent [19]

Yamamoto et al.

[11] Patent Number: 5,546,403
[45] Date of Patent: Aug. 13, 1996

[54] BIDIRECTIONAL LINE SWITCH RING NETWORK

[75] Inventors: Chiyoko Yamamoto; Daisuke Maruhashi; Masahiro Shioda, all of Kawasaki, Japan

[73] Assignee: Fujitsu Limited, Kanagawa, Japan

[21] Appl. No.: 195,586

[22] Filed: Feb. 14, 1994

[30]        Foreign Application Priority Data

Mar. 29, 1993   [JP]   Japan .................................... 5-070053

[51] Int. Cl.⁶ .................................................. G06F 11/00
[52] U.S. Cl. ........................................ 371/20.5; 371/2.1
[58] Field of Search ............................ 371/2.1, 8.2, 11.2, 371/20.5, 20.6

[56]               References Cited

PUBLICATIONS

*Computer Architecture and Organization Second Edition* by John P. Hayes ©1988 by McGraw–Hill, Inc. pp. 496.
*Advanced Microprocessors* by Daniel Tabak ©1991 McGraw–Hill, Inc. pp. 77–79.

Primary Examiner—Vincent P. Canney

[57]               ABSTRACT

A bidirectional line switch ring network wherein, when a fault occurs in the ring transmission line, a loopback is formed at the node adjoining the fault so as to loop back the line between a first optical fiber and a second optical fiber and therefore protect the line. The time slot numbers of the working line time slots and the time slot numbers of the line protection time slots allotted in the first optical fiber and the time slot numbers of the working line time slots and the time slot numbers of the line protection time slots allotted in the second optical fiber are set to be respectively the same. By this, the configuration and control of the hardware handling the loopback switching are simplified.

9 Claims, 10 Drawing Sheets

BIDIRECTIONAL LINE SWITCH RING NETWORK

BACKGROUND OF THE INVENTION

1. Field of the Invention

The present invention relates to a two-fiber directional line switching ring network, more particularly a loopback switching operation in such a ring network.

One of the new synchronous digital hierarchy networks now being promoted as 8 standard in North America is the synchronous optical network (SONET) system. In a ring network of the SONET system, a ring is comprised of a pair of optical fibers. One of these two optical fibers performs the transmission of data in the clockwise direction, while the other performs the transmission of data in the counterclockwise direction. Each optical fiber is divided inside into time slots for the working line and time slots for line protection. When a line disconnection or other fault occurs, the working line time slots in one optical fiber are looped back to the line protection time slots of the other optical fiber so as to protect the line and maintain communications in the network.

2. Description of the Related Art

As will be explained later with reference to the attached drawings, loopback switching was basically performed as follows in the related art.

Assume a line disconnection occurs in a transmission route in the above ring network. When this happens, a loopback switching operation is performed by a selector in a first node (A). In the time slot interchange (TSI) in the first node (A), the transmission data is transferred (from working line slots #1 to #24 to line protection slope #25 to #48) and the transmission route is looped beck. Here, the transmission data follows the path of the second node (B)→first node (A)→ second node (B)→third node (C) to reach the original terminating fourth node (D). At the TSI in the fourth node (D), the transmission data is transferred (line protection slot #25 to #48 to working line slot #1 to #24) and the transmission data is dropped from the fourth node (D).

In this conventional loopback switching operation, there were at least the following four problems:

(1) The above-mentioned selector became larger in size.
(2) The above-mentioned time slot interchange became larger in size.
(3) The control became complicated.
(4) The data switching time became longer.

SUMMARY OF THE INVENTION

Therefore, in view of the above-mentioned problems, the present invention has as its object the simplification of the hardware configuration and control for handling the loopback switching and the reduction of the data switching time.

To attain the above object, the present invention provides a ring transmission line comprised of a first optical fiber and a second optical fiber, wherein the time slot numbers of the working line time slots and the time slot numbers of the line protection time slots allotted in the first optical fiber and the time slot numbers of the working line time slots and the time slot numbers of the line protection time slots allotted in the second optical fiber are set to be respectively the same.

BRIEF DESCRIPTION OF THE DRAWINGS

The above object and features of the present invention will be more apparent from the following description of the preferred embodiments with reference to the accompanying drawings, wherein.

DESCRIPTION Of THE PREFERRED EMBODIMENTS

Before describing the embodiments of the present invention, the related art and the problems therein will be first described with reference to the related figures.

Figure 1:
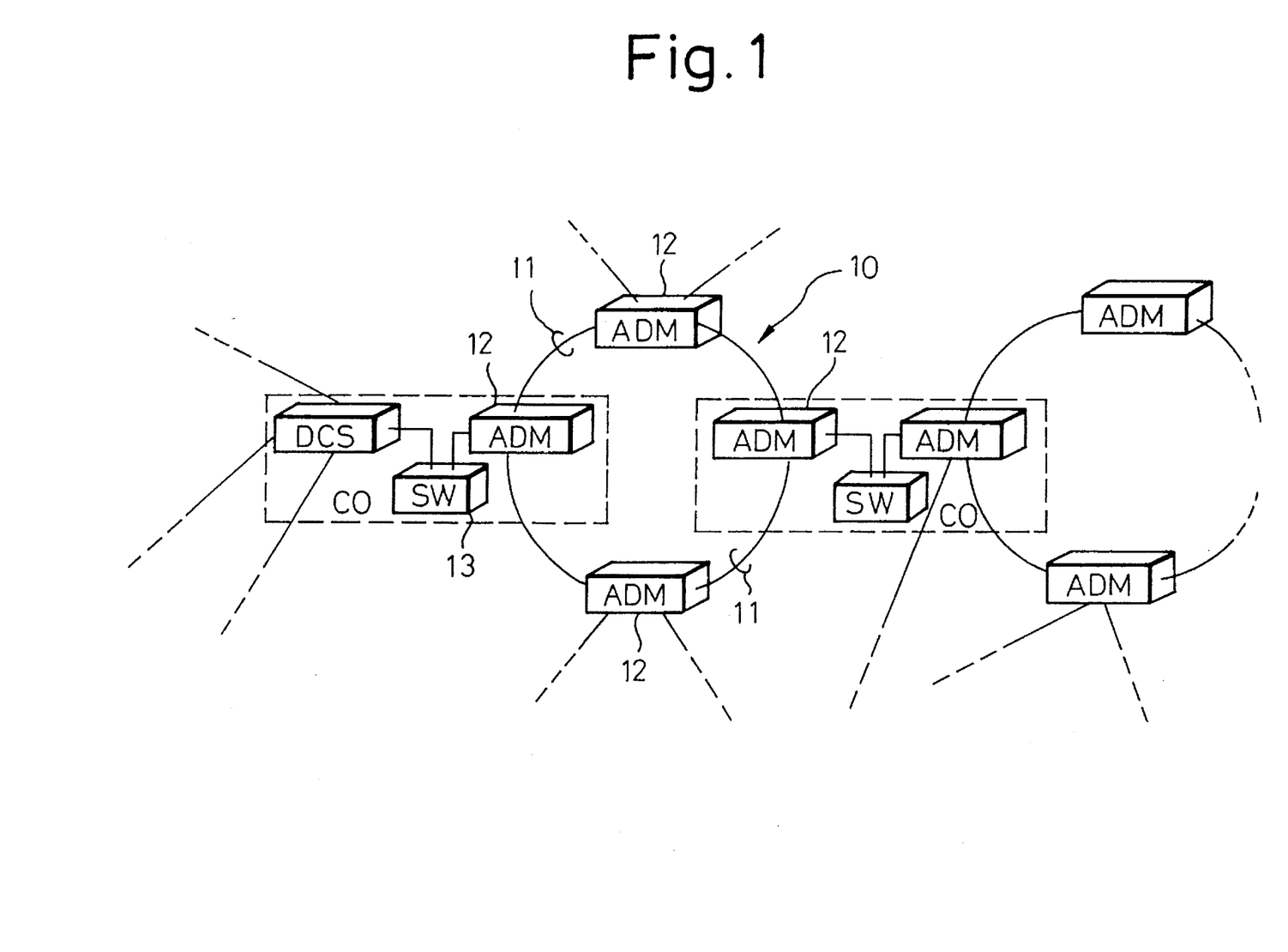
FIG. 1 is a view of an example of the configuration of a general ring network to which the present invention is applied.

FIG. 1 is a view of an example of the configuration of a general ring network to which the present invention is applied. In the figure, reference numeral 10 shows a two-fiber bidirectional line switch ring network as a whole. This is mainly comprised of a line transmission line 11 and a plurality of nodes 12 inserted in the same at predetermined intervals. The ring transmission line 11, as mentioned later, has a two-fiber construction comprised of a first optical fiber and a second optical fiber. Each of the nodes 12, specifically, is comprised of an add/drop multiplexer (ADM). One node 12 connects to a low transmission capacity ADM and a line terminating equipment (LTE), thereby forming a network. The other nodes 12 exist as part of a central office having a switchboard (Sw).

Figure 2:
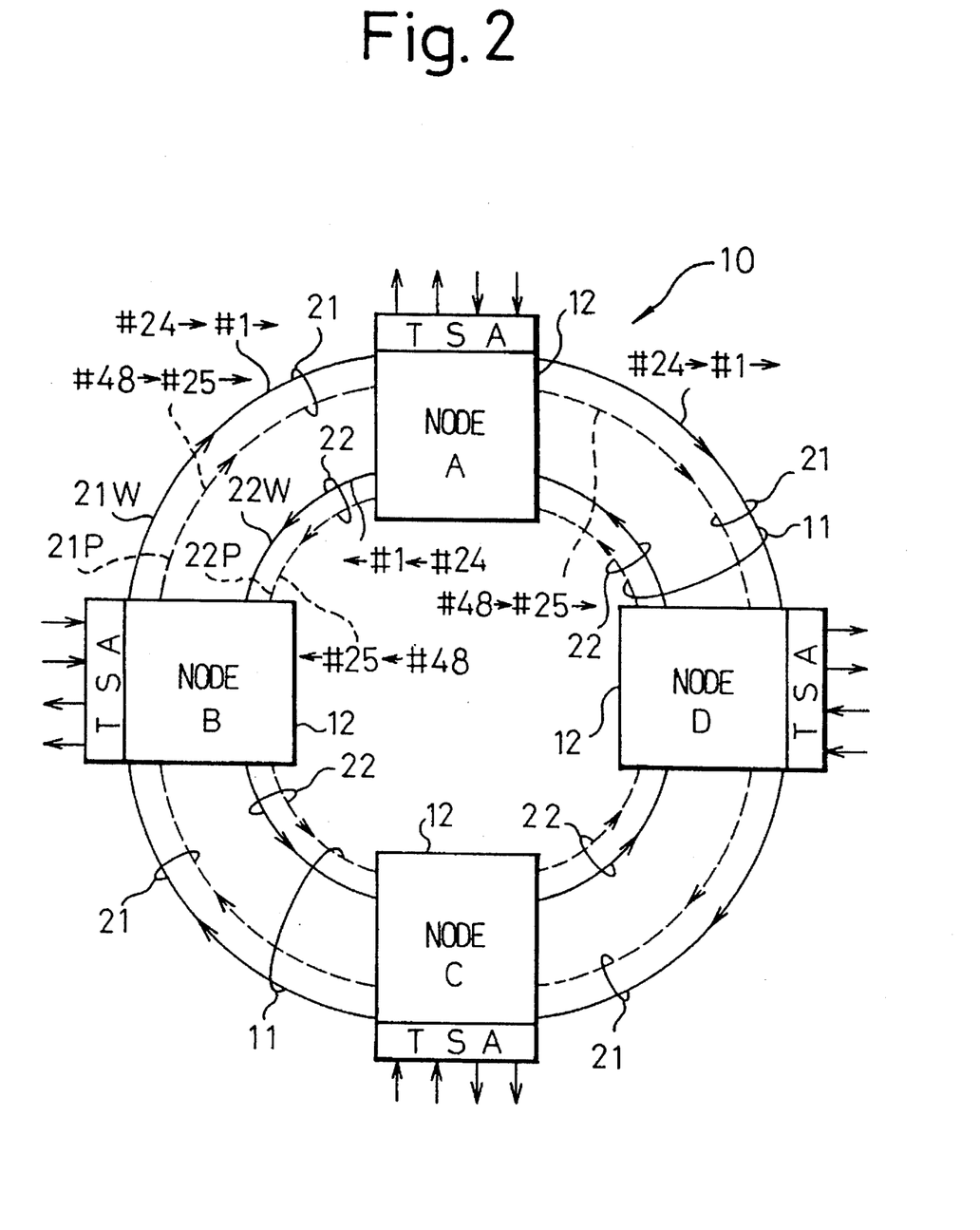
FIG. 2 is a view of the conventional configuration of a ring transmission line.

FIG. 2 is a view of the conventional configuration of a ring transmission line. The configuration of the lane transmission line 11 is drawn here in further detail. That is, the ring transmission lane 11 is comprised of a first optical fiber 21 and a second optical fiber 22. These fibers 21 and 22 are arranged in parallel with each other and perform transmission of data in the clockwise direction and counterclockwise direction. Each, further, transmit data divided into working line time slots (shown by the solid lane 21W and the solid line 22W) and line protection time slots (shown by the broken line 21P and the broken line 22P). Note that in the figure, for assisting understanding, the optical fibers 21 and 22 are each drawn as two lines, i.e., the solid line and broken line, but in actuality each optical fiber ie comprised of a single line through which the working line time slots and the line protection time slots continuously flow. Note too that in the figure, the example is taken of the case of an optical carrier (OC) 48 to show the time slots in further detail. That is, in the first optical fiber 21, the working line time slots 21W share the time slot number #1 to #24 at a bit rate of 1.2 Gbps, while the line protection time slots 21P share the time slot numbers #25 to #48. In the same way, in the second optical fiber 22, the working line time slots 22W share the time slot numbers #1 to #24 at a bit rate of 1.2 Gbps, while the line protection time slots 22P share the time slot numbers #25 to #48 at a bit rate of 1.2 Gbps.

Note that each of the nodes 12 in the figure perform a "through", i.e., relay, "addition", i.e., insertion, or "drop" operation on the transmission data. The function of performing the add or drop operation on the transmission data is the block TSA, that is, the time slot assignment unit.

The present invention relates to the loopback switching operation performed when a line disconnection or other fault occurs in a ring network having such a ring transmission line 11. First, consider the case of a line disconnection in the ring network of FIG. 2.

Figure 3:
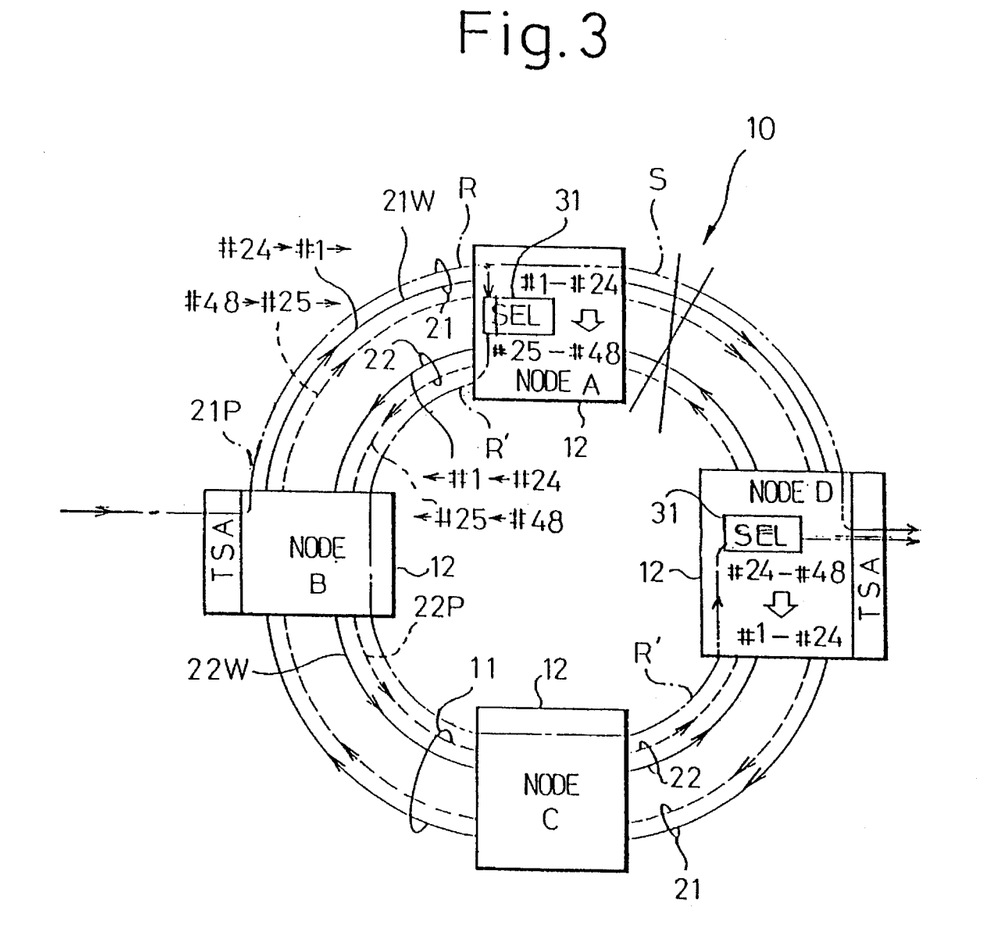
FIG. 3 is a view showing the loopback 8witching operation in the ring transmission line of FIG. 2.

FIG. 3 is a view showing a loopback switch in the ring transmission line of FIG. 2. For example, assume that a line disconnection (shown by the x mark in the figure) occurs between the node (A) 12 and the node (D) 12. Further, in this case, as an example, note the transmission route over which the transmission data added from the node (B) is dropped from the node (D) 12. Both the dot-dash line R and the two-dot-dash line route S in the figure show the transmission route.

A line disconnection shown by the x mark, however, occurs on this transmission route, and a loopback switching operation is performed by the selector (SEL) 31 in the node (A) 12. The transmission data is transferred by a time slot interchange (TSI), not shown, in the node (A) 12 (from the working line slots #1 to #24 to the line protection slots #25 to #48) and the transmission route is turned from the dot-dash line R to the dot-dash line R'. Here, the transmission data passes through the route of the node (B)→node (A)→node (B)→node (C) to reach the original terminating node (D). The transmission data is then once again transferred at the TSI (not shown) in the node (D) (from line protection slots #25 to #48 to the working line slots #1 to #24) to drop the transmission data from the node (D).

Figure 4:
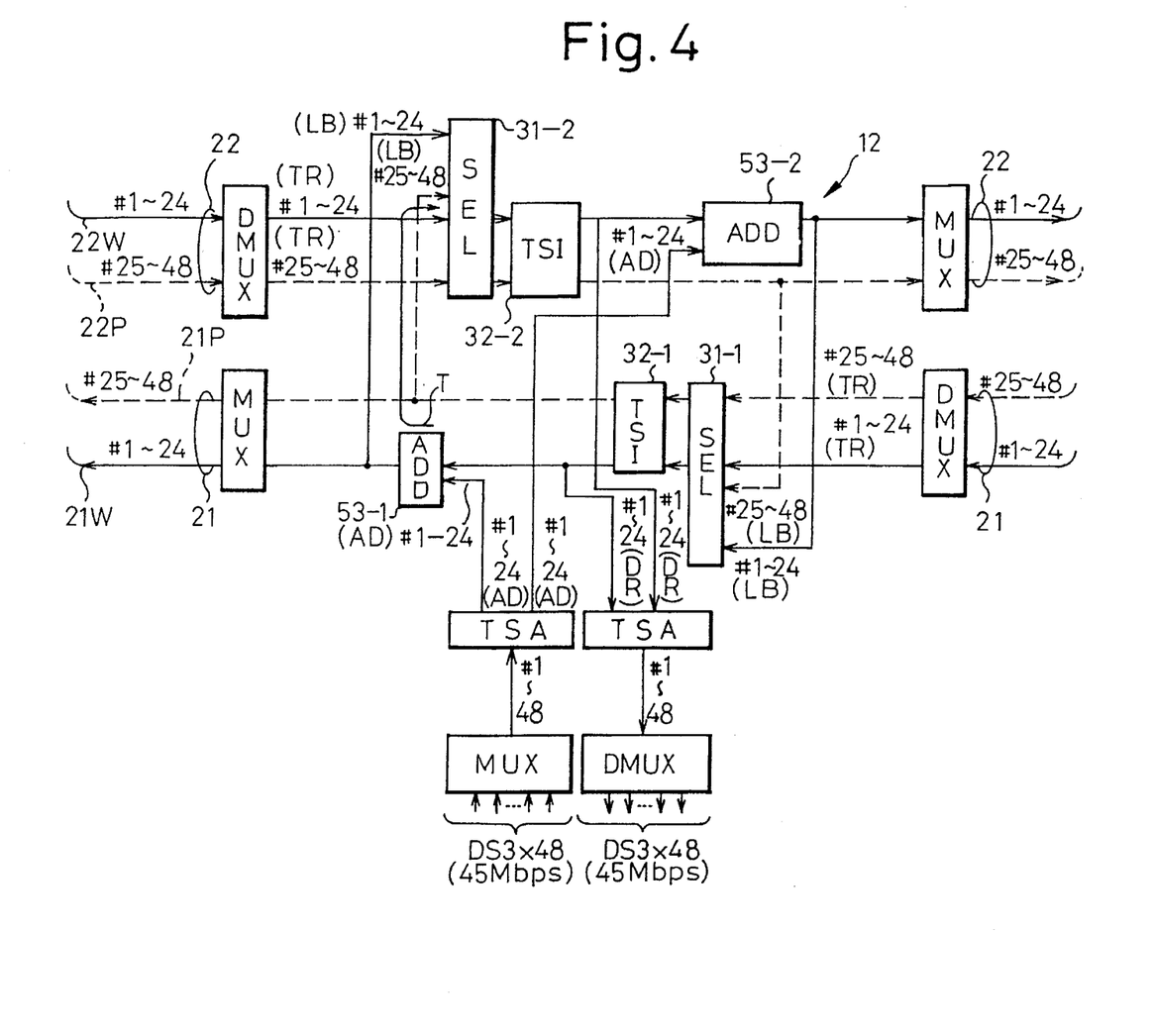
FIG. 4 is a view showing a conventional example of the loopback switching related portion in a node.

FIG. 4 is a view showing a conventional example of the loopback switching related portion in a node. At the top portion of the figure, the top system of the two systems extending left to right belongs to the second optical fiber 22, while the bottom system belongs to the first optical fiber 21. The two systems are symmetrically laid out, but have the same construction. The portions in them particularly relating to the loopback switching operation are the selectors 31-1 and 31-2 and the time slot interchanges TSI 32-1 and 32-2. In addition, MUX shows a multiplexer unit, DMUX a demultiplexer unit, and ADD (53-1 and 53-2) the ADD's for performing the addition of the transmission data. TSA is the time slot assignment unit shown in FIGS. 2 and 3. Further, (TR) in the figure means through use, (AD) add use, (DR) drop use, and (LB) loopback use.

The above conventional loopback switching operation suffered from the four problems outlined above. More particularly, (1) In FIG. 4, assuming the case of formation of the loopback shown by the arrow mark T, the selector 31-2 (same for 31-1) had to perform large-scale selection of time slots (TR #1 to #24 and #25 to #48 (2.4 Gbps) or LB #1 to #24 and #25 to #48 (2.4 Gbps)) extending over the working line time slots 22W and the line protection time slots 22P, so the eelsero=became large in size.

(2) When forming the above-mentioned loopback T, the time slot interchange 32-2 (same for 32-1) had to perform large-scale rearrangement of the time slots (#1 to #48) extending over the working line time slots 22W and the line projection time slots 22P, so the tame slot interchange became large is size.

(3) Further, the time slot interchange 32-2 had to change in operation depending on whether the selector 31-2 selected TR (through) (normal times) or selected LB (loopback) (line disconnection), making control complicated. That is, when TR (through) was selected, it had to rearrange the working line time slots eo as not to overlap the time slots of the added transmission data, while when LB (loopback) was selected, it had to perform a shift operation of #1 to #24→#25 to #48 in the working line time slots and a shift operation of #225 to #48→#1 to #24 in the line protection time slots.

(4) As explained in Pig. 3, the transfer of transmission data by the selector 31 had to be performed at two locations the node A and the node D, making the data switching time longer.

The present invention solves the above-mentioned four problems by simplifying the hardware configuration and control for the loopback switching operation and shortening the data switching time.

Figure 5:
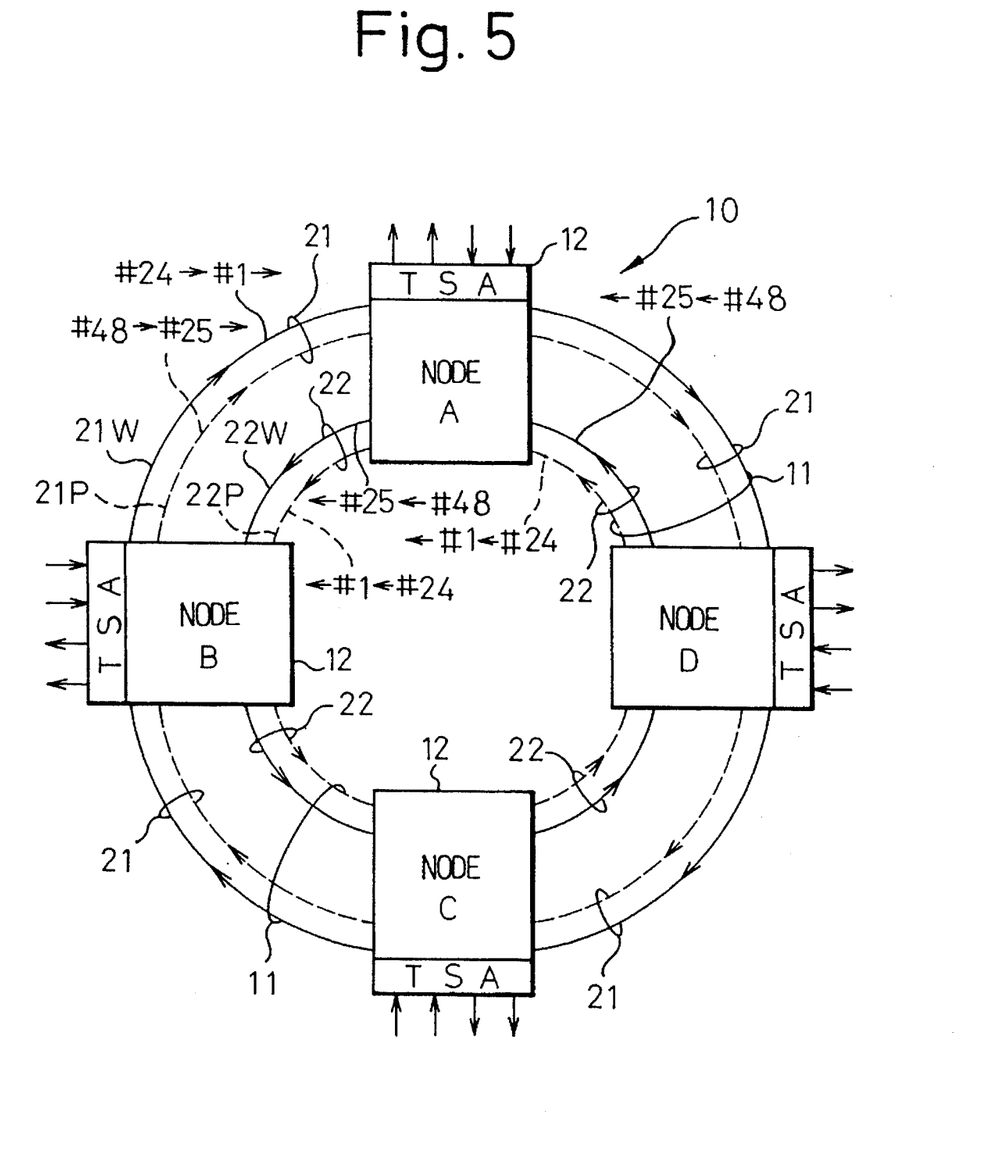
FIG. 5 is a schematic view of the principle of the present invention.

FIG. 5 is a schematic view of the principle of the present invention and corresponds to the above-mentioned FIG. 2. Note that throughout the figures, the same reference numerals or symbols are given to similar constituent elements. As shown in this figure, in the present invention, the time slot numbers (#1 to #24) of the time slots 21W for the Working line and the time slot numbers (#25 to #48) of the time slots 21P for line protection allotted in the first optical fiber 21 and the time slot numbers of the time slot 22W for the working line and the time slot numbers of the time slots 22P for line protection allotted in the second optical fiber are set to be respectively the same. That is, the time slot numbers of the line protection time slots 22P allotted in the second optical fiber 22 are made #1 to #24 and the time slot numbers of the working line time slots 22W are made #25 to #48.

Figure 6:
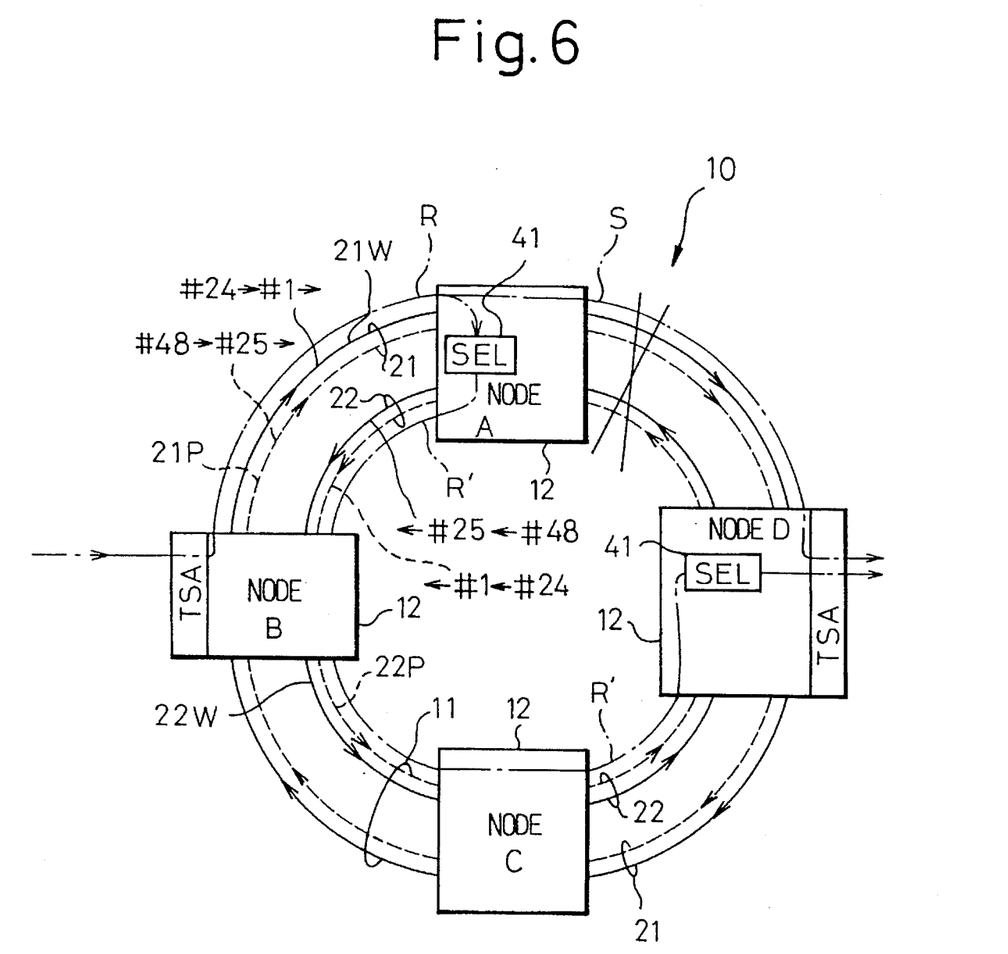
FIG. 6 is a view showing the loopback switching operation in the ring transmission line of FIG. 5.

The mode of operation based on the principle of the present invention is clear from reference to FIG. 6. FIG. 6 is a view showing the loopback switching operation in the ring transmission line of FIG. 5 and corresponds to the above-mentioned FIG. 3. Comparing FIG. 3 and FIG. 6, in the node (A) 12, the working line time slots #1 to #24 are turned to the line protection time slots #1 to #24 as they are. Further, if a loopback switching operation is performed to the node (A) side at the node (B) 12, the working line time slots #25 to #48 in the second optical fiber 22 are turned to the line protection time slots #25 to #48 in the first optical fiber 21 as they are.

Therefore, the time slot interchange in the node (A) 12 shown in FIG. 6 does not have to perform the time slot rearrangement operation as in the past. The operation of transferring the transmission data becomes unnecessary at the node (D) as well. The selector 41 need only perform a simple changeover operation selecting the TR (through) side or selecting the LB (loopback) side. Further, as explained in detail in FIG. 7, looking at the time slot interchange (TSI) as well, the TSI (52-1) of the first optical fiber 21 side need only rearrange the time slots #1 to #24, that is, half of the time slots #1 to #48. Further, the TSI (52-2) of the second optical fiber 22 side need only rearrange the time slots #25 to #48, that is, half of the time slots #1 to #48. Further, both the TSI of the first optical fiber 21 side and the TSI of the second optical fiber 22 side do not have to change in operation depending on whether the TR (through) side is selected or the LB (loopback) side is selected, as in the past. That is, even when the TR (through) side is selected, the operation is completely the same as when the LB (loopback) side is selected.

Figure 7:
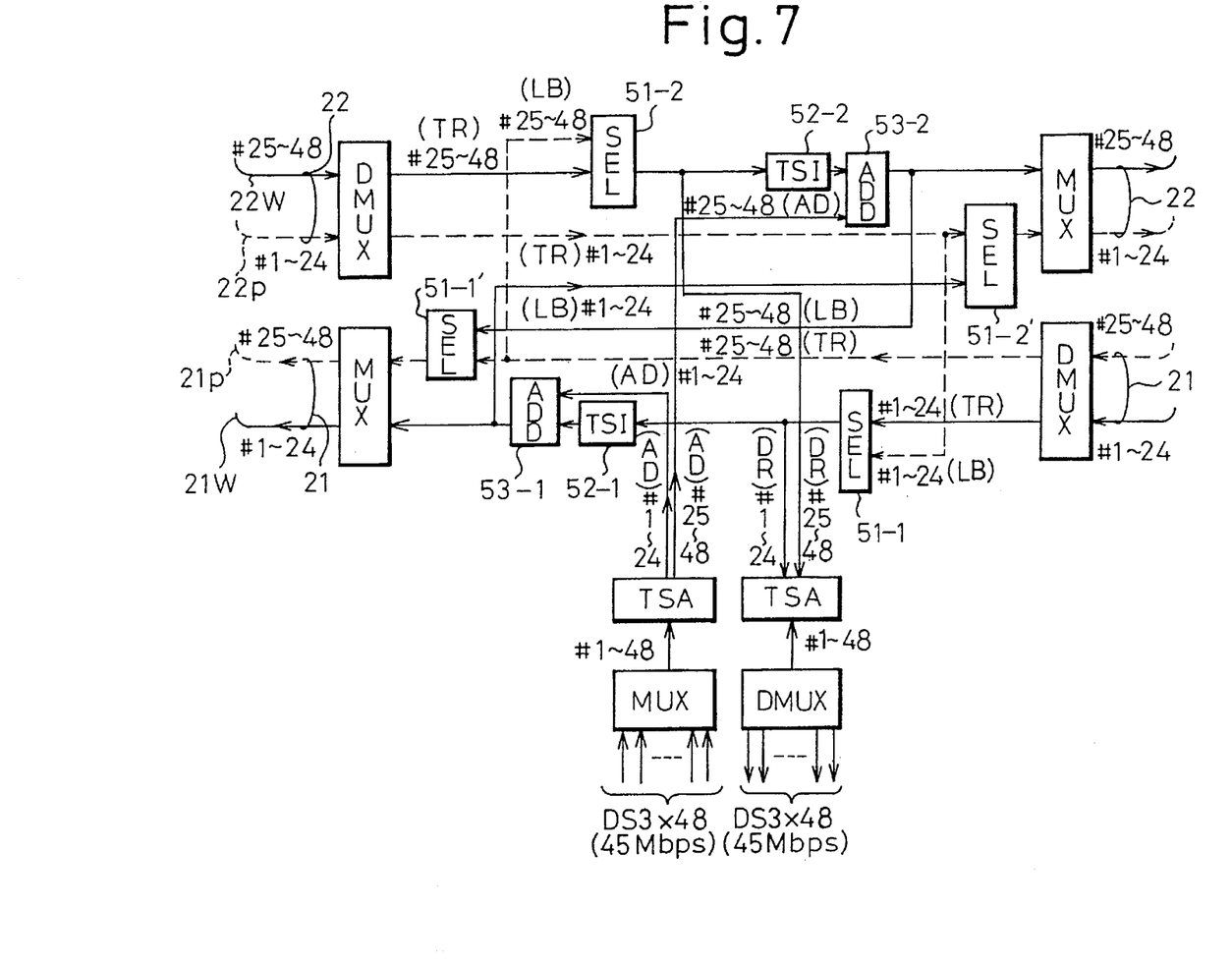
FIG. 7 is a view showing an example of the constitution of a node in the case of the present invention, FIG. 8 i a view of a example of the configuration of a time slot interchange.

FIG. 7 is a view showing an example of the constitution of a node in the case of the present invention. The point most notable in the comparison of FIG. 7 and FIG. 4 is that, in the present invention, the time slot interchanges (TSI) are provided only for the working line sides (21W, 22W). Unlike in the past, here is no provision of time slot interchanges (TSI) covering both of the working line side and line protection side. Further, separate selectors (SEL) are provided for the working line sides (21W, 22W) and the line protection sides (21P, 22P). Unlike in the past, there is no provision of selectors (SEL) covering both of the working line side and line protection side.

First, basically, the second optical fiber 22 side in each of the nodes 12 is provided with a line protection selector 51-2' for selecting either the line protection time slots 22P sent over the second optical fiber 22 or the working line time slots 21W sent over the first optical fiber 21 to form a loopback from the first optical fiber 21 to the second optical fiber 22.

Further, the following configurations are preferable. The first optical fiber 21 side may be provided with a line protection selector 51-1' for selecting either the line protection time slots 21P sent over the first optical fiber 21 or the working line time slots 22W sent over the second optical fiber 22 so as to form a loopback from the second optical fiber 22 to the first optical fiber 21.

Further, the second optical fiber 22 side may be provided with a line protection selector 51-2 for selecting either the working line time slots 22W sent over the second optical fiber 22 or the line protection time slots 21P sent over the first optical fiber 21 so as to form a loopback from the first optical fiber 22 to the second optical fiber 22.

Further, the first optical fiber 21 side may be provided with a working line selector 51-1 for selecting either the working line time slots 21w sent in the first optical fiber 21 or the line protection time slots 22P sent in the second optical fiber 22. This forms the loopback from the second optical fiber 22 to the first optical fiber 21.

Next, looking at the time slot interchange TSI, in each of the nodes 12, between the working line selector 51-1 provided at the first optical fiber 21 side and the line protection selector 51-2' provided at the second optical fiber 22 side, provision is made of a time slot interchange 52-1 for switching the working line time slots 21w sent in the first optical fiber 21.

Also, between the working line selector 51-2 provided at the second optical fiber 22 side and the line protection selector 51-1' provided at the first optical fiber 21 side there is provided a time slot interchange 52-2 for switching the working line time slots 22W sent in the second optical fiber 22.

Next, looking at the ADD, in each of the nodes 12, an ADD 53-1 for inserting the transmission data from each node is connected to the output side of the time slot interchange 52-1 provided at the first optical fiber 21 side.

In the same way, an ADD 53-2 for inserting the transmission data from each node is connected at the output side of the time slot interchange 52-2 provided at the second optical fiber 22 side.

In this construction, the time slot interchange 52-1 (52-2) operates the same both when the selector 51-1 (51-2) selects the through side and selects the loopback (LB) side. It merely rearranges the time slots of the added transmission data and the time slots of the through transmission data so as not to overlap. In this case, the time slot interchange 52-1 handles only half of the slots #1 to #48 (#1 to #24), while the time slot interchange 52-2 handles only half of the slots #1 to #48 (#25 to #48). Further, the selector (SEL) need only perform a simple switching operation between the through side and the loopback side. Note that the SONET System is completely synchronized as a whole. The through side and the loopback side are always in complete synchronization and therefore the above-mentioned simple switching operation becomes possible.

Figure 8:
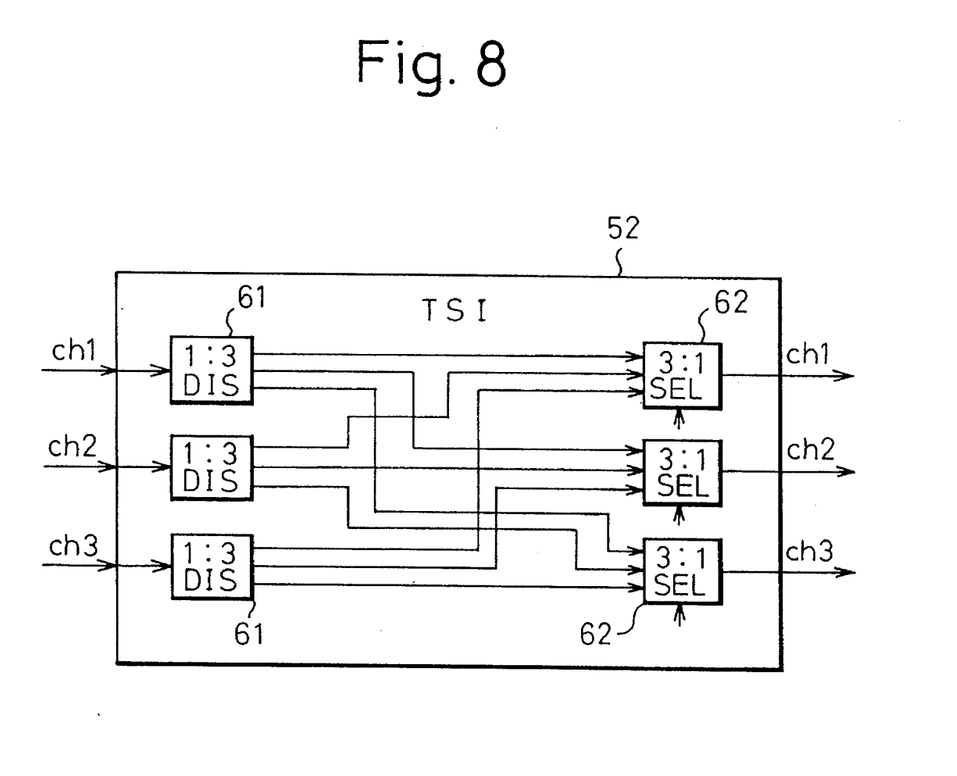

FIG. 8 is a view of an example of the configuration of a time slot interchange. Here, however, for simplification, the case is shown of three time slots. In the figure, 61 is a 1·3 distributor, which divides the signals of the corresponding channel 8 (ch) into three. The divided signals become the three inputs to the 3·1 selectors 62. One of these is selected here. Note that the selected information is shown by the arrow mark at the bottom of the 3·1 selectors 62 in the figure.

Figure 9:
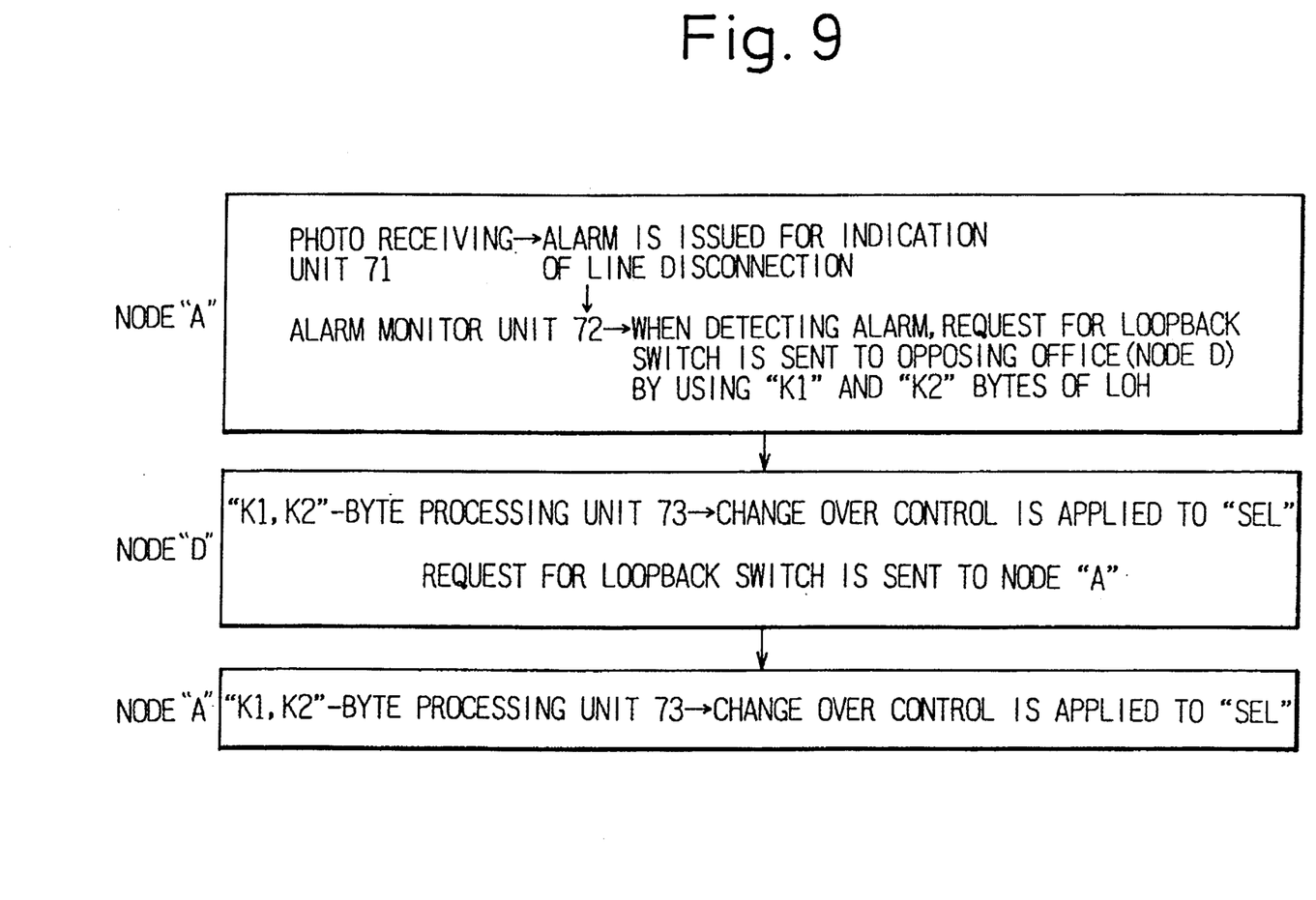
FIG. 9 is a view showing the processing at a node in the case of the occurrence of a line disconnection.
Figure 10:
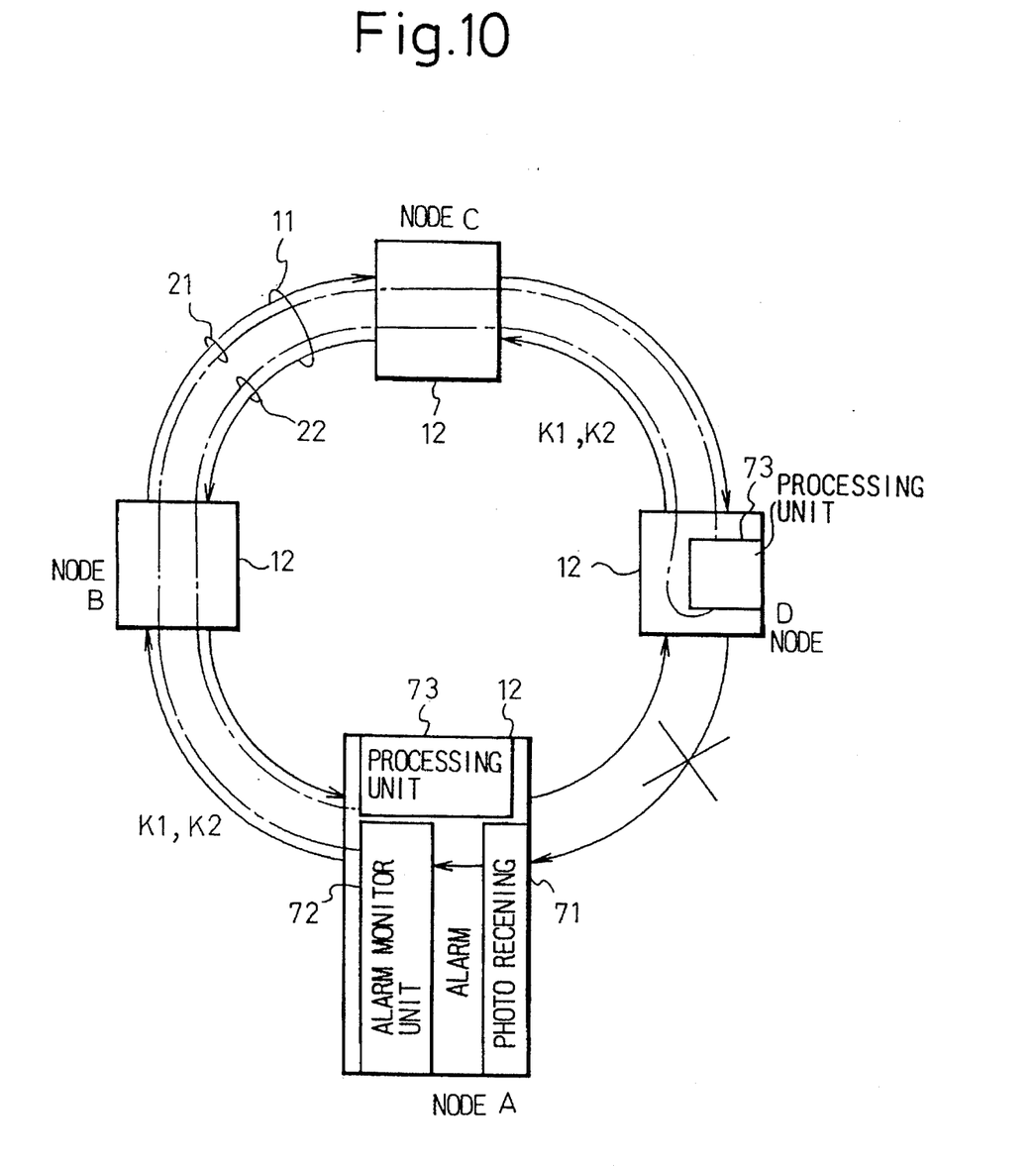
FIG. 10 is a schematic view of the processing of FIG. 9.

FIG. 9 is a view showing the processing at a node in the case of the occurrence of a line disconnection, and FIG. 10 is a schematic view of the processing of FIG. 9. Referring to FIG. 9 and FIG. 10, assume a line disconnection occurs at the x mark in FIG. 10. When this happens, an alarm is detected at the alarm monitor unit 72 of the node A and a loopback switching is requested to the node D of the opposing office. In this case, use is made of the K1, K2 bytes of the line overhead (LOH). The K1 and K2 bytes are bytes used for automatic protection switching (APS). Note that the terms K1, K2, LOH, APS, etc. are set in the specifications for SONET and are well known. Further to detect line disconnection, use is made of a "loss of signal" (LOS) showing disconnection of light input and "loss of frame" (LOF) showing asynchronizaton. In the SONET systsm, further, disconnection o one fiber is treated in the same way as a disconnection of both fibers as shown in FIG. 6.

The K1, K2 byte processing unit 73 in the node D performs control for switching the above-mentioned selector (SEL), or example, the selector 51-2' of FIG. 7. The request for loopback switching is transmitted to the node A as well. At this time too, use is made of the K1, K2 bytes of LOH.

The node A receives the request for loopback switching and performs control to switch the selector (SEL) by the K1, K2 byte processing unit 73 in it, for example, performs control for switching the selector 51-2 of FIG. 7.

As explained above, according to the present invention, it is possible to simplify the hardware configuration and control for handling the loopback switching at the nodes and it is possible to reduce the data switching time even more than with the conventional loopback switch.

We claim:

1. A bidirectional line switch ring network comprising:
    a ring transmission line including a first transmission line and a second transmission line which are laid in a ring in parallel with each other and which are each divided into working line time slots and line protection time slots for transmission of data and
    a plurality of nodes of which are inserted in the ring transmission line and perform through, addition, and drop operations on the transmission data,
    in which network, when a fault occurs in said ring transmission line, a loopback is formed by means of line protection selectors and working line selectors at the node adjoining the fault so as to loop back the ring transmission line between the first transmission line and the second transmission line and thereby protect the line, wherein
    the time slot numbers of the working line time slots and the time slot numbers of the line protection time slots allotted in the first transmission line and the time slot numbers of the line protection time slots and the time slot numbers of the working line time slots allotted in the second transmission line are set to be respectively the same, the time slot numbers being unchanged during formation of said loopback.

2. A bidirectional line switch ring network as in claim 1, wherein the second transmission line side in each of the nodes is provided with one said line protection selector for selecting one of the line protection time slots sent in the second transmission line and the working line time slots sent in the first transmission line to thereby form a loopback from the first transmission line to the second transmission line.

3. A bidirection line switch ring network as in claim 1, wherein the first transmission line side in each of the nodes is provided with one side line protection selector for selecting one of the line protection time slots sent in the first transmission line and the working line time slots sent in the second transmission line to thereby form a loopback from the second transmission line to the first transmission line.

4. A bidirection line switch ring network as in claim 3, wherein the second transmission line side in each of the nodes is provided with one side working line selector for selecting one of the working line time slots sent in the second transmission line and the line protection time slots sent in the first transmission line to thereby form a loopback from the first transmission line to the second transmission line.

5. A bidirectional line switch ring network as in claim 4, wherein the first transmission line side in each of the nodes is provided with one said working line selector for selecting one of the working line time slots sent in the first transmission line and the line protection time slots sent in the second transmission line to thereby form a loopback from the second transmission line to the first transmission line.

6. A bidirectional line switch ring network as in claim 5, wherein each of the nodes is provided between the working line selector provided at the first transmission line side and the line protection selector provided at the second transmission line side with a time slot interchange for switching the working line time slots sent in the first transmission line.

7. A bidirectional line switch ring network as in claim 6, wherein each of the nodes is provided between the working line selector provided at the second transmission line side and the line protection selector provided at the first transmission line side with a time slot interchange for switching the working line time slots sent in the second transmission line.

8. A bidirectional line switch ring network as in claim 7, where in each of the nodes, an ADD for adding the transmission data from the nodes is connected to the output side of the time slot interchange provided at the first transmission line side.

9. A bidirectional line switch ring network as in claim 7, wherein in each node, an ADD for adding the transmission data from the nodes is connected to the output side of the time slot interchange provided at the second transmission line side.

* * * * *